(12) United States Patent
Paul et al.

(10) Patent No.: US 6,223,109 B1
(45) Date of Patent: Apr. 24, 2001

(54) CONTROLLER AND CONTROL SYSTEM FOR AN OCCUPANT PROTECTION DEVICE IN A MOTOR VEHICLE AND METHOD OF TRANSMITTING DATA IN THE CONTROL SYSTEM

(75) Inventors: Klemens Paul, Obertraubling (DE); Kenneth Francis, Rochester Hills, MI (US); Robert Kolar, Ihrlerstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/099,183

(22) Filed: Jun. 18, 1998

(30) Foreign Application Priority Data

Jun. 18, 1997 (DE) .............................. 197 25 846

(51) Int. Cl.$^7$ .................................. B60R 21/32
(52) U.S. Cl. ................ 701/45; 701/29; 701/30; 701/1
(58) Field of Search ................ 701/29, 30, 1, 701/45

(56) References Cited

U.S. PATENT DOCUMENTS

| 4,614,876 | * | 9/1986 | Mattes et al. | 307/10 SB |
|---|---|---|---|---|
| 4,700,974 | * | 10/1987 | Andres et al. | 280/806 |
| 4,900,079 | * | 2/1990 | Obara et al. | 296/65.1 |
| 5,327,014 | * | 7/1994 | Huber et al. | 307/10.1 |
| 5,359,515 | * | 10/1994 | Weller et al. | 364/424.05 |
| 5,363,302 | * | 11/1994 | Allen et al. | 364/424.05 |
| 5,749,059 | * | 5/1998 | Walton | 701/45 |
| 5,820,162 | * | 10/1998 | Fink | 280/742 |
| 5,835,873 | * | 11/1998 | Darby et al. | 701/45 |

FOREIGN PATENT DOCUMENTS 0693 401A2    1/1996   (EP) .

* cited by examiner

Primary Examiner—William A. Cuchlinski, Jr.
Assistant Examiner—Marthe Marc-Coleman
(74) Attorney, Agent, or Firm—Herbert L. Lerner; Laurence A. Greenberg; Werner H. Stemer

(57) ABSTRACT

A controller for an occupant protection device in a motor vehicle includes a control unit, a first interface for receiving data, and a second interface. The second interface effects data interchange with a control device remote from the controller and operable with vehicle-specific characteristic operating values. After the controller has received vehicle-specific characteristic operating values for the control device, the characteristic operating values are passed on via the second interface to the control device and are stored there.

15 Claims, 2 Drawing Sheets

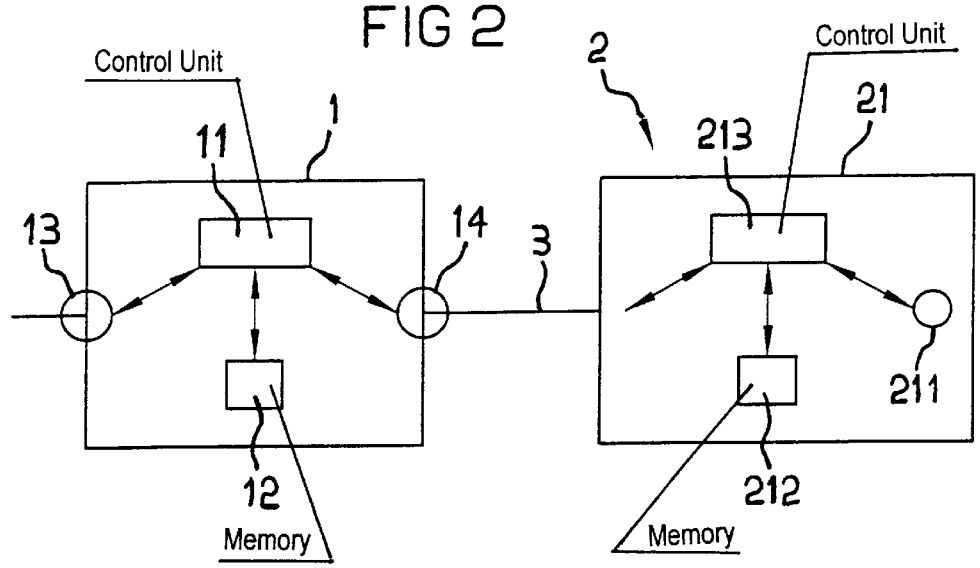
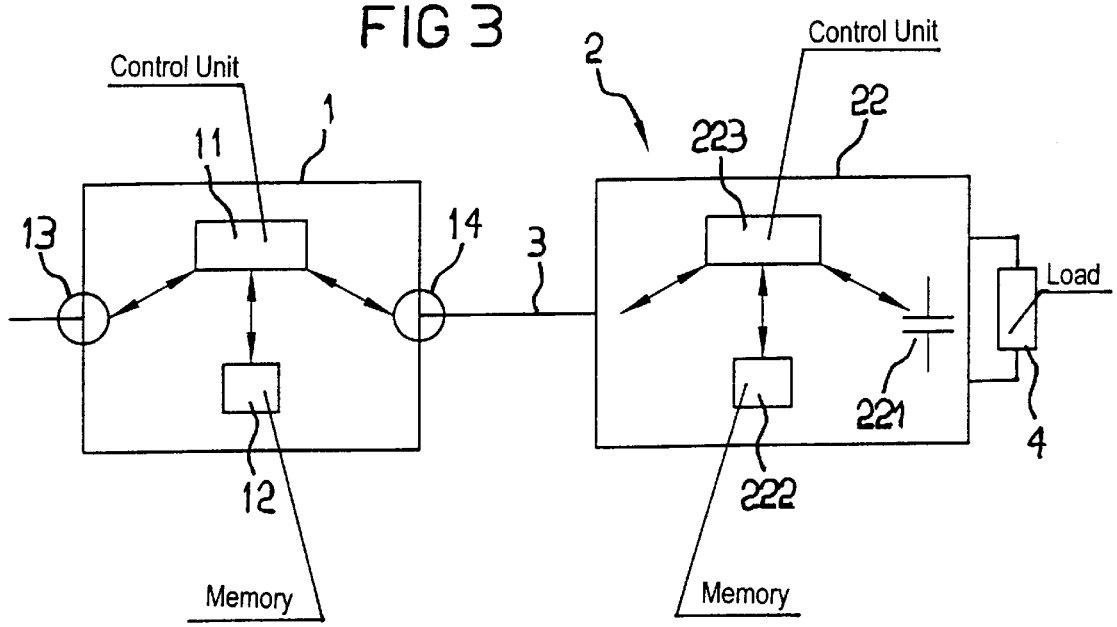

CONTROLLER AND CONTROL SYSTEM FOR AN OCCUPANT PROTECTION DEVICE IN A MOTOR VEHICLE AND METHOD OF TRANSMITTING DATA IN THE CONTROL SYSTEM

BACKGROUND OF THE INVENTION

Field of the Invention

The invention relates to a controller for an occupant protection device in a motor vehicle. The controller has a control unit, a first interface for receiving data, and a further interface for the data interchange with a control device that is disposed remote from the controller and is operable in dependence on vehicle-specific characteristic operating values. The invention also relates to a control system with such a controller, as well as to a method of transmitting data in such a control system for an occupant protection device in a motor vehicle.

Controllers for occupant protection devices in motor vehicles usually have a control unit, a memory and various interfaces for connecting remote control devices, such as sensors or actuators for example. In that case, the controller is usually placed centrally in the vehicle, for example fastened on the vehicle tunnel. The control devices are arranged outside. If such a control device is, say, a sensor for picking up transverse accelerations, it is preferably fastened on a side part of the vehicle or a transverse member of the vehicle. A control device designed as a firing device for a driver's or passenger's airbag is preferably fastened on the steering wheel or dashboard. Furthermore, the controller described above usually has a diagnostic interface, generally for the reading in and out of diagnostic information and data during repair or maintenance cycles.

The prior art control system described in European published patent application EP 0 693 401 A2 has a controller disposed centrally in the vehicle, with acceleration sensors for longitudinal vehicle acceleration and transverse vehicle acceleration, as well as a control unit and a memory. Furthermore, a plurality of interfaces for the connection of firing devices are provided, as well as two interfaces for the connection of outside sensor devices. One sensor device is in this case arranged on each side of the vehicle for picking up transverse vehicle accelerations.

Depending on their use in a certain type of motor vehicle, both the central controller and the outside sensor devices require individual characteristic operating values/parameters provided for the respective vehicle type. Such characteristic operating values may be, for example, parameters for a triggering algorithm executed in the controller or else, according to the above-mentioned EP 0 693 401, threshold values for the sensor devices: in each sensor device, the measured transverse vehicle acceleration is classified on the basis of given threshold values. The class determined is then fed to the controller via the corresponding interface.

Until now, each controller and each control device has been provided with the associated characteristic operating values via its respectively own interface before being installed in the motor vehicle. This has generally been done by the supplier prior to shipping. Each controller or each control device has then been color-coded or mechanically coded in such a way that it was immediately evident to the assembly fitter which controller or which control device is intended for which motor vehicle type, in order that the controller or control device contains correct characteristic operating values and that it is functionally in order for protection of the occupants. The color-coding or mechanical coding requires extensive, differentiated stock keeping both at the supplier's and at the automobile manufacturer's as well as correspondingly complex logistics. The interface provided for each control device specifically for feeding in characteristic operating values requires intensive use of components and is complex to manufacture.

The international publication WO 93/20490, which is determinative of the genus herein, discloses an integrated network with controllers. Each controller contains sets of parameters for all possible motor vehicle types in which the controller can be used. After installation in the vehicle and the networking of controllers prepared in this way, the end-of-tape programmer transfers to a selected one of these controllers an indicator for the selection of a specific set of parameters for each controller. The indicator is transmitted from the selected controller via the network to the other controllers, which then form the corresponding selection of the set of parameters for the operation of the control device.

A disadvantage of the prior art control system is that each controller must have a relatively large memory area available for receiving all the conceivable vehicle-dependent characteristic data. Since these characteristic data are generally stored in a ROM, the known control system is extremely unsuitable for changes to be made, for example when further operating parameters for new motor vehicle types are added.

SUMMARY OF THE INVENTION

It is accordingly an object of the invention to provide a controller and control system for an occupant protection device in a motor vehicle and method of transmitting data in the control system, which overcomes the above-mentioned disadvantages of the prior art devices and methods of this general type and which provides the control device with its vehicle-specific characteristic operating data in a way which is suitable for changes to be made.

With the foregoing and other objects in view there is provided, in accordance with the invention, a controller for an occupant protection device in a motor vehicle, comprising:

a control unit with a first interface for receiving data and a second interface for data transfer with a control device disposed remote from the controller, wherein the control device is operable in dependence on vehicle-specific characteristic operating values;

the control unit receiving signals at the first interface containing vehicle-specific characteristic operating values for the control device and transferring the characteristic operating values to the second interface for transmission to the control device.

In other words, the control unit is designed in such a way that, after receiving a signal transmitted via the first interface (the signal contains vehicle-specific characteristic operating values for the control device), the control unit passes on these characteristic operating values to the second interface.

In accordance with an added feature of the invention, the first interface is a diagnostic interface.

In accordance with another feature of the invention, the controller is integrated in a control system for a motor vehicle occupant protection system and the above-mentioned control device is a sensor device with at least one impact sensor and a memory for storing the characteristic operating values.

In accordance with again another feature of the invention, the control device is firing device for a firing element of the occupant protection device and includes a memory for storing the characteristic operating values.

In accordance with again an additional feature of the invention, the memory of the sensor device and/or of the firing device is a volatile memory or, alternatively, a non-volatile memory.

With the above and other objects in view there is also provided, in accordance with the invention, a method of transmitting data in a control system for an occupant protection device in a motor vehicle, between a controller and at least one control device, which is operable in dependence on vehicle-specific characteristic operating values, and which includes at least one memory, the method which comprises:

transmitting to a controller of a control device in a motor vehicle occupant protection device only characteristic operating values relevant for the operation of a respective control device in a selected vehicle type; and subsequently, with the controller, passing on the characteristic operating values to the control device and storing the characteristic operating values in a memory of the control device.

In accordance with an additional feature of the invention, the characteristic operating data are transmitted in the first method step before the motor vehicle is put into operation, and the characteristic operating data are stored in a non-volatile memory of the controller.

In accordance with again an additional feature of the invention, the characteristic operating values are passed on to the control device before the motor vehicle is put into operation, and the characteristic operating data are stored in a non-volatile memory of the control device.

In an alternative method, the characteristic operating data are stored in a volatile memory of the control device.

Thus, in the case of an integrated system installed and networked in the vehicle and comprising a controller and one or more control devices, only those characteristic operating values for the control device which are intended for the vehicle in which the control device is arranged are transferred to the controller. The diagnostic interface of the controller is preferably used for this purpose. The characteristic operating values to the controller in this case are generally transmitted by means of a signal which has an information block with the characteristic operating values as its data content as well as a control word which indicates to the control unit of the controller that characteristic operating values for the control device are about to be transmitted. If such a control word is detected by the control unit of the controller, the control unit passes on the characteristic operating data to the control device, generally by means of an internal control command. In this case, the operating data may be passed through directly from the first interface to the second interface or be stored briefly in a register of the control unit and then passed on to the control device. Optionally, the characteristic operating values may also be additionally stored in a non-volatile memory of the controller. If a plurality of control devices are connected to the controller via the same data line, the signal with the characteristic operating values which is received via the first interface generally also contains in its control word the information specifying for which of the control devices the characteristic operating values are intended. However, what is essential for the invention is that only those characteristic operating values which are used in the control device during vehicle operation are transmitted to the controller.

It will be appreciated by those who are skilled in the pertinent art that numerous modifications are included within the invention: for example, the first and second interfaces may be implemented together and have a common data transmission format. The term characteristic operating values also covers vehicle-specific program routines and algorithms.

Other features which are considered as characteristic for the invention are set forth in the appended claims.

Although the invention is illustrated and described herein as embodied in a controller and control system for an occupant protection device in a motor vehicle and method of transmitting data in the control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram of a first control system according to the invention; and FIG. 3 is a block diagram of a second control system according to the invention.

DESCRIPTION OF THE PREFERRED EMBODIMENTS

Figure 1:
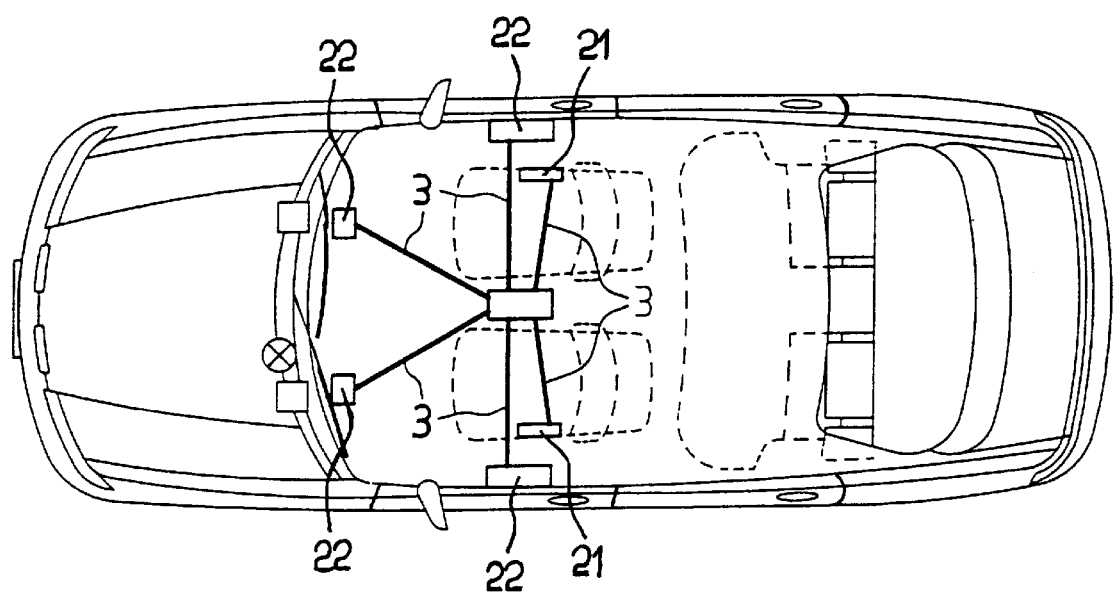
FIG. 1 is a schematic top plan view of a control system according to the invention in a motor vehicle.

Referring now to the figures of the drawing in detail and first, particularly, to FIG. 1 thereof, there is seen a motor vehicle with a controller 1 for a plurality of occupant protection devices. Occupant protection device are understood generally to mean airbags, belt tensioners, rollover bars and other restraining means. The controller 1 includes, inter alia, a non-illustrated acceleration sensor for longitudinal accelerations and/or transverse accelerations. If a (non-illustrated) control unit of the controller detects an adequately strong frontal or oblique impact on the basis of the acceleration signals supplied by the longitudinal acceleration sensor, firing devices 22 for the driver's and passenger's airbag, which are symbolically depicted on the dashboard in FIG. 1, are actuated via lines 3 or a common bus. For firing, the controller 1 transmits a coded firing command to the firing devices 22. A further control unit of the firing device decodes the transmitted message and, in the case of a correctly transmitted firing command, supplies a firing element connected to the firing device 22 with adequate current/energy from a firing capacitor of the firing device or of the vehicle battery.

The controller 1 may, furthermore, trigger firing devices 22, symbolically depicted on the side parts of the vehicle, of side airbags via lines 3. Sensor devices 21, depicted underneath the vehicle seats, for each side of the vehicle pick up transverse accelerations of the vehicle, which are also classified in the sensor devices 21. On the basis of the information obtained from the sensor devices 21 via lines 3, the control unit of the controller 1 decides whether triggering of the side airbags is required or not. Firing of the side airbags takes place in a way analogous to firing of the front airbags.

FIG. 2 schematically shows a block diagram of a control system according to the invention with a controller 1, which is connected via a line 3 to a remote sensor device 21 as a control device 2. The controller 1 includes a control unit 11 and a memory 12. The sensor device 21 includes a further control unit 213, an impact sensor 211 and a further memory 212.

For triggering an occupant protection device once the vehicle has been put into operation and once the vehicle ignition has been actuated, the control system according to FIG. 2 behaves in the way described above. Before such regular operation, in other words before the motor vehicle is put into operation, the controller 1 and the sensor device 21 are provided with required evaluation and control algorithms and with communications software for the data transmission between the controller 1 and the control device 2. Such calculation rules are stored in a non-volatile, read-only memory (ROM) of the controller 1 or of the control device 2. The sensor device 21 may be designed not just for picking up transverse vehicle accelerations but in principle also, or additionally, for any desired vehicle acceleration, as well as in combination with controllers for different functionality, such as for example for an engine control system for picking up any desired physical measured variable.

The specific characteristic operating values, according to vehicle type or installation location, for the controller 1 and the control device 2 are fed to these components after they have been fitted in the motor vehicle. What is essential here according to the invention is that the characteristic operating values of the control device 2 are not fed directly to the latter but indirectly via the controller 1 connected to the control device 2. The feeding of the characteristic operating values intended for the control device 2 takes place via a first interface 13 of the controller 1, generally a diagnostic interface, which may serve not just for feeding the characteristic operating values but also for reading out stored status values or for testing the control system functions, in particular for repair and maintenance.

The first interface 13 and the further interface 14, via which the controller 1 is connected to the control device 2, are assumed to be defined by their function: they serve for the controlled transmission, sending or receiving of messages and have data transmission formats (protocols) usually required for this purpose, associated driver software as far as the communicating devices are concerned and, if appropriate, required hardware, such as for example the line 3 according to FIG. 3. The interfaces 13, 14 are not tied to one particular transmission medium: line-bound and line-free transmission are included.

The characteristic operating values of the control device 2, transmitted via the diagnostic interface 13, are initially received in the controller 1 and can be stored in the preferably non-volatile memory 12. A control word of the signal fed to the controller and containing the characteristic operating values contains the information, important for the control unit, that the data which follow are characteristic operating values for the control device. For the further transmission of the characteristic operating values to the control device 2, according to the invention a corresponding control command is provided in the set of commands for the control unit 11 of the controller 1. The further control unit 213 of the sensor device 21 receives these data and stores them in a further memory 212 of the sensor device.

The provision of the control demand described above allows the control device 2 to be fitted in the vehicle and to be connected to the controller 1 in the vehicle before the control device 2 is provided with its characteristic operating values. One advantage is that the transferring (downloading) of the characteristic operating values to the control device 2 now no longer has to take place at the supplier's but may be carried out at the automobile manufacturer's, making it possible to dispense with a formerly mechanical coding or color-coding of the control devices 2 provided with their characteristic operating values. Control devices 2, provided in particular as peripheral devices for a central controller, are now passed on by the supplier to the automobile manufacturer without characteristic operating values and are fitted in the vehicle at the manufacturer's. This fundamentally simplifies logistics and stock keeping both at the supplier's and at the automobile manufacturer's. A further advantage of the invention is that an additional interface, if appropriate, of the control device 2, via which the characteristic operating values of the latter can be entered directly, is no longer required. Instead, the further interface 14 between controller 1 and control device 2, which in normal operation serves for the data transmission of triggering-relevant information from the control device 2 to the controller 1 or for functional checking of the outside sensor device 2 by the controller 1, is repeatedly used by the transmission of characteristic operating values according to the invention.

In a first method step, the characteristic operating values for the control device are stored in the memory 12 of the controller 1, it also being possible of course in this method step for characteristic operating values for the controller 1 itself to be transmitted and stored in the non-volatile memory 12. After this first method step, two further, but differing, method steps according to the invention are advantageous:

If the further memory 212 of the control device 2 is of a non-volatile design, before the motor vehicle is put into operation, in other words at the factory, the characteristic operating values for the control device 2 are likewise transmitted via the further interface 14 to the control device 2 and are stored there in the further memory 212. In this case, when it receives the characteristic operating values, the control unit 11 of the controller 1 detects the control command for passing through the data to the control device 2. Both memories 12 and 212 store the respective characteristic operating values over the entire lifetime of the control system.

If the further memory 212 of the control device 2 is of a volatile design, according to the invention immediately after each time the control device is put into operation, in other words every time the vehicle ignition is actuated, the characteristic operating values for the control device 2 are transmitted out of the non-volatile memory 12 of the controller 1 via the further interface 14 to the control device 2 and are stored there in the volatile and, in particular, repeatedly writeable memory (RAM). They are available only during the period of operation of the control system, rather than during the entire lifetime of the control system—as in the case of the first method according to the invention. An initializing program, which is started in the controller 1 after the vehicle ignition has been actuated, in this case contains the control command for transmitting the characteristic operating values of the control device 2 to the latter.

FIG. 3 shows a block diagram which is substantially similar to FIG. 2 and in which the sensor device 21 as the control device 2 from FIG. 2 has now been replaced by a firing device 22. Such a firing device may also require vehicle-specific characteristic operating values for it to operate properly. These are fed to the firing device 22 in a way analogous to the method described above.

We claim:

1. A controller for an occupant protection device in a motor vehicle, comprising:

a control unit with a first interface for receiving data and a second interface for data transfer with a control device disposed remote from said controller, the control device being operable in dependence on vehicle-specific characteristic operating values, said control unit having a non-volatile memory;

said control unit receiving signals at said first interface containing vehicle-specific characteristic operating values for the control device and transferring the characteristic operating values to said second interface for transmission to the control device, said control device having a memory; and said vehicle-specific characteristic operating values transmitted to the controller after manufacture of the controller but before putting the motor vehicle into operation.

2. The controller according to claim 1, wherein said first interface is a diagnostic interface.

3. The controller according to claim 1, wherein said memory of said control device is a volatile memory.

4. The controller according to claim 1, wherein said vehicle-specific characteristic operating values are fed to the controller after the controller has been installed in the motor vehicle.

5. A control system with a controller for an occupant protection device in a motor vehicle, comprising:

a control unit with a first interface for receiving data and a second interface, said control unit having a non-volatile memory;

a sensor device remote from the controller and operable in dependence on vehicle-specific characteristic operating values, said sensor device including at least one impact sensor and a volatile memory for storing the characteristic operating values;

said control unit receiving signals at said first interface containing vehicle-specific characteristic operating values for said sensor device and transmitting the characteristic operating values to said sensor device via said second interface, said sensor device having a memory; and said vehicle-specific characteristic operating values transmitted to the controller after manufacture of the controller but before putting the motor vehicle into operation.

6. The control system according to claim 5, wherein said first interface is a diagnostic interface.

7. The control system to claim 5, wherein said memory of said control device is a volatile memory.

8. The control system to claim 5, wherein said vehicle-specific characteristic operating values are fed to the controller after the controller has been installed in the motor vehicle.

9. A control system with a controller for an occupant protection device in a motor vehicle, comprising:

a control unit with a first interface for receiving data and a second interface, said control unit having a non-volatile memory;

a firing device remote from the controller and operable in dependence on vehicle-specific characteristic operating values, said firing device firing a firing element of the occupant protection device and including a memory for storing the characteristic operating values;

said control unit receiving signals at said first interface containing vehicle-specific characteristic operating values for said firing device and transmitting the characteristic operating values to said firing device via said second interface; and said vehicle-specific characteristic operating values transmitted to the controller after manufacture of the controller but before putting the motor vehicle into operation.

10. The control system according to claim 9, wherein said first interface is a diagnostic interface.

11. The control device according to claim 9, wherein said memory of said firing device is a volatile memory.

12. The control device according to claim 9, wherein said vehicle-specific characteristic operating values are fed to the controller after the controller has been installed in the motor vehicle.

13. A method of transmitting data in a control system for an occupant protection device in a motor vehicle, between a controller and at least one control device, operable in dependence on vehicle-specific characteristic operating values, and including at least one memory, the method which comprises:

transmitting to a controller of a control device in a motor vehicle occupant protection device only characteristic operating values relevant for the operation of a respective control device in a selected vehicle type, the characteristic operating data stored in a non-volatile memory of the controller; and subsequently, with the controller, passing on the characteristic operating values to the control device and storing the characteristic operating values in a memory of the control device; and transmitting the vehicle-specific characteristic operating values to the controller after manufacture of the controller but before putting the motor vehicle into operation.

14. The method according to claim 13, wherein the characteristic operating values are stored in a volatile memory.

15. The method according to claim 13, wherein the vehicle-specific characteristic operating values are fed to the controller after the controller has been installed in the motor vehicle.

* * * * *